(12) United States Patent
Kronmeyer

(10) Patent No.: US 7,201,404 B1
(45) Date of Patent: Apr. 10, 2007

(54) UNION NUT WITH LOCK MEMBER

(75) Inventor: Don Kronmeyer, Yorba Linda, CA (US)

(73) Assignee: Related Metal Fabrication, Inc., San Bernardino, CA (US)

( * ) Notice: Subject to any disclaimer, the term of this patent is extended or adjusted under 35 U.S.C. 154(b) by 135 days.

(21) Appl. No.: 10/738,591

(22) Filed: Dec. 17, 2003

(51) Int. Cl.
*F16L 25/00* (2006.01)

(52) U.S. Cl. .................. 285/386; 285/387; 285/388; 285/327; 285/354

(58) Field of Classification Search ............... 285/386, 285/387, 388, 325, 327, 354, 326
See application file for complete search history.

(56) References Cited

U.S. PATENT DOCUMENTS

| | | | | |
|---|---|---|---|---|
| 344,312 | A | * | 6/1886 | Guillemin .................. 285/327 |
| 609,509 | A | | 8/1898 | Jensen |
| 1,186,021 | A | * | 6/1916 | Metzger ..................... 285/388 |
| 1,790,891 | A | * | 2/1931 | Wright ......................... 285/81 |
| 1,806,788 | A | * | 5/1931 | Cross et al. ................. 285/327 |
| 1,863,978 | A | * | 6/1932 | Foucault .................... 285/327 |
| 1,941,467 | A | * | 1/1934 | Fausek ..................... 239/424.5 |
| 2,286,105 | A | * | 6/1942 | Quinn ........................ 285/327 |
| 2,353,012 | A | | 7/1944 | Cheney |
| 2,424,682 | A | * | 7/1947 | Ebert ........................... 285/33 |
| 2,438,107 | A | * | 3/1948 | Babbit ........................ 285/388 |
| 2,506,286 | A | * | 5/1950 | Wittlin .................... 285/334.3 |
| 3,428,337 | A | | 2/1969 | Read |
| 3,709,526 | A | | 1/1973 | Cromie |
| 4,007,953 | A | * | 2/1977 | Powell ....................... 285/321 |
| 4,150,847 | A | * | 4/1979 | De Cenzo .................... 285/93 |
| 4,226,164 | A | | 10/1980 | Carter |
| 4,343,496 | A | | 8/1982 | Petranto |
| 4,407,529 | A | * | 10/1983 | Holman ....................... 285/82 |
| 4,516,278 | A | | 5/1985 | Lamond |
| 4,544,185 | A | * | 10/1985 | Weirich et al. .......... 285/124.4 |
| 4,623,123 | A | * | 11/1986 | Traylor ....................... 251/340 |
| 4,923,349 | A | | 5/1990 | Logsdon |
| 4,927,192 | A | * | 5/1990 | Ungchusri et al. .......... 285/305 |
| 5,409,270 | A | | 4/1995 | Shinohara et al. |
| 5,529,348 | A | * | 6/1996 | Wasserman et al. ..... 285/288.6 |
| 6,460,901 | B1 | | 10/2002 | Rochelle |

* cited by examiner

*Primary Examiner*—Vishal Patel
(74) *Attorney, Agent, or Firm*—Mary Jo Redman; Calif Tervo; Palomar Patent

(57) ABSTRACT

Union nut (10) includes body (20) and lock member (50). Body (20) includes thread retaining end (30) with threads (33) for mounting upon a threaded pipe (120) and flange retaining end (40) including partial collar (41) for partially retaining a flanged pipe (140). Lock member (50) slidably engages with body (20) to fully retain and support pipe flange (143).

7 Claims, 2 Drawing Sheets

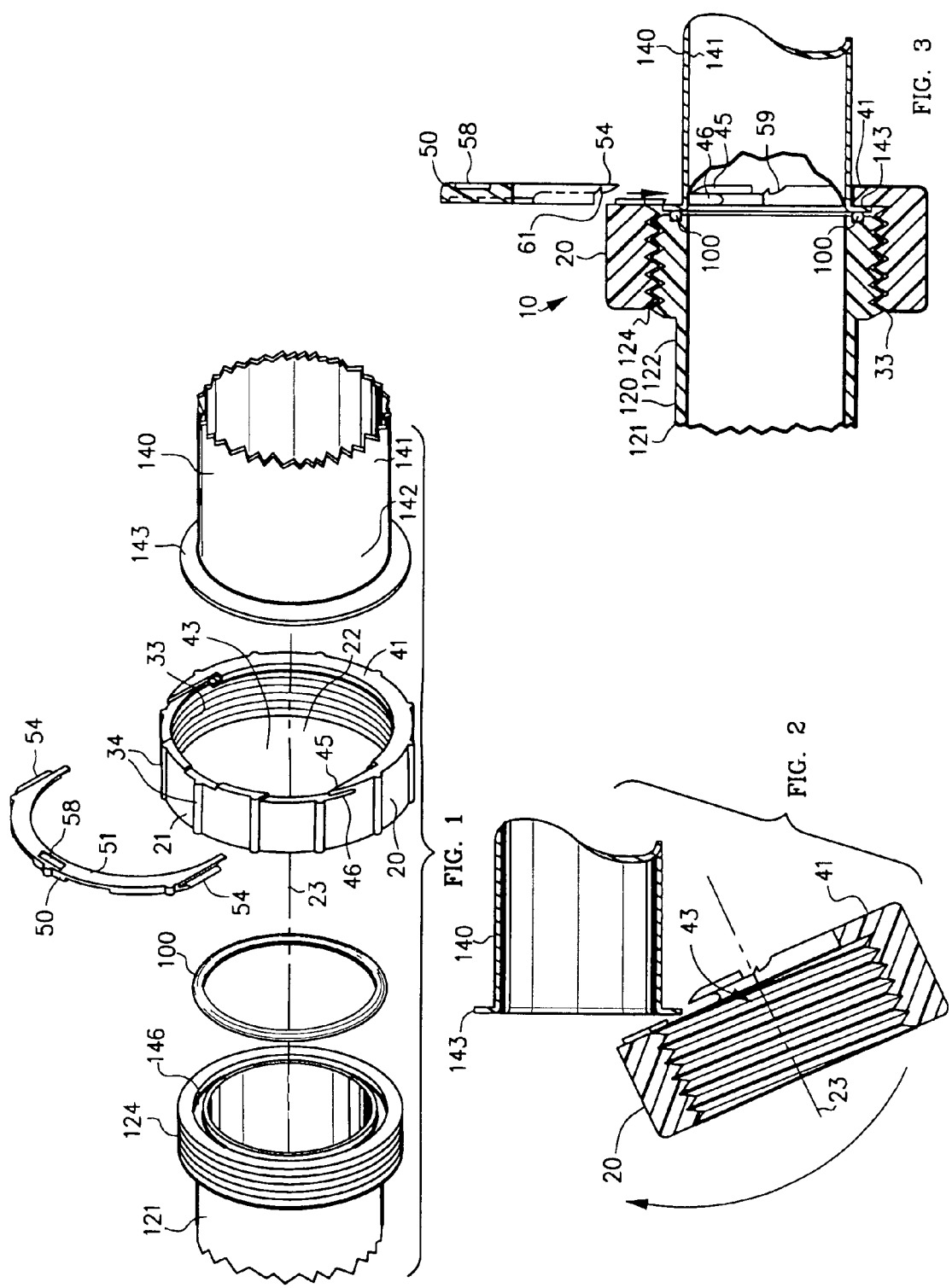

UNION NUT WITH LOCK MEMBER

FIELD OF THE INVENTION

This invention relates in general to connectors for pipes, and more specifically to a union nut for connecting a flanged pipe to a threaded pipe.

BACKGROUND OF THE INVENTION

A pipe containing a spa heating element typically is a steel pipe with flanged ends. To assemble the spa plumbing, or other plumbing including flanged pipe, it is necessary to connect the flange of the pipe to another pipe, such as a threaded polyvinyl chloride (PVC) pipe.

Union, or coupler, nuts are used to connect such pipes. Conventional union nuts have an internal flange, or collar, to retain the flange of the pipe and press the flange against the end of the threaded pipe. Because the collar of a conventional union nut has an inside diameter smaller than the outside diameter of the pipe flange, union nuts are conventionally slipped onto a length of steel pipe before the flanges are formed on the ends.

Fabrication of the flanges is hampered by the presence of the union nuts. Shipping, storage, and handling of the pipe is inconvenient. If a union nut installed on a flanged pipe is accidentally broken or damaged, the entire pipe may be useless.

Because of the above problems, union nuts that can be installed on a pipe already having flanged ends have been developed. There are two-part, or split, nuts and nuts with a very narrow collar that can be forced over the pipe flange. both these types of union nuts have shortcomings.

Split nuts are formed in two halves that are sandwiched onto the flanged pipe then connected together, such as with screws. Split union nuts have been manufactured by injection molding. They have the disadvantage that the two halves tend to deform away from perfect semi-circularity. When the halves are mated, the threads do not match up perfectly, making the union nut difficult to connect to the threaded pipe. The split union nuts are not as strong or reliable as unitary nuts. Also, additional parts, such as screws, are needed, as well as the tool to install them.

Union nuts have been made with a narrow, deformable flange-retaining collar so that the flange of the pipe can be forced through the central bore of the collar at an angle. Obviously, such a design allows very little overlap of the pipe flange and the union nut collar. Narrow collar nuts have a variety of leakage problems and they are not reliable enough for many applications.

There is thus a long-felt need for a union nut that is as strong and reliable as conventional union nuts and that can be installed on pipes already having flanged ends. There is a need for such a union nut that is easy to install correctly every time without tools.

SUMMARY OF THE INVENTION

The present invention is a union nut with a lock member, which can be installed upon a flanged end of a pipe, such as a pipe with flanges already fabricated at both ends or with an end unavailable for a conventional union nut.

The nut includes a cylindrical body having a thread retaining end and a flange retaining end. The thread retaining end has unitary interior threading that screws reliably onto a threaded pipe. The flange retaining end includes a "cutaway" collar for retaining a portion, typically about half, of the pipe flange. Because the collar is partially cut away, the central aperture easily receives a pipe flange.

To fully retain the flange, a lock member, or clip, is snapped into place on the union nut. The lock member "completes" the collar so that the pipe flange is fully supported and retained. The lock member snaps onto the body of the nut without tools and cannot be dislodged accidentally or casually.

The union nut with lock member holds the pipe ends securely and reliably. With a typical gasket or O-ring seal inserted between the flange and the butt end of the threaded pipe, the union nut of the present invention produces a watertight seal, even when installed in the field. Because the union nut with lock member is formed with unitary, not split, threads, the thread retaining end remains cylindrical and always mates with the threaded pipe. The flange retaining partial collar and lock member cooperate to form an annular collar that is rigid and wide, supporting the pipe flange securely.

The invention will now be described in more particular detail with respect to the accompanying drawings in which like reference numerals refer to like parts throughout.

BRIEF DESCRIPTION OF THE DRAWINGS

FIG. 1 is an environmental, perspective, exploded view of the union nut with lock member with a threaded pipe, a gasket, and a flanged pipe.

FIG. 2 is a side section view of the union nut body and flanged pipe of FIG. 1, with union nut body in position to be slipped onto flanged pipe.

FIG. 3 is a side section view of the threaded pipe, gasket, union nut body, and flanged pipe of FIG. 1 assembled into a joint, with union nut lock member in position to be snapped into engagement with union nut body.

DETAILED DESCRIPTION OF THE INVENTION

Figure 4:
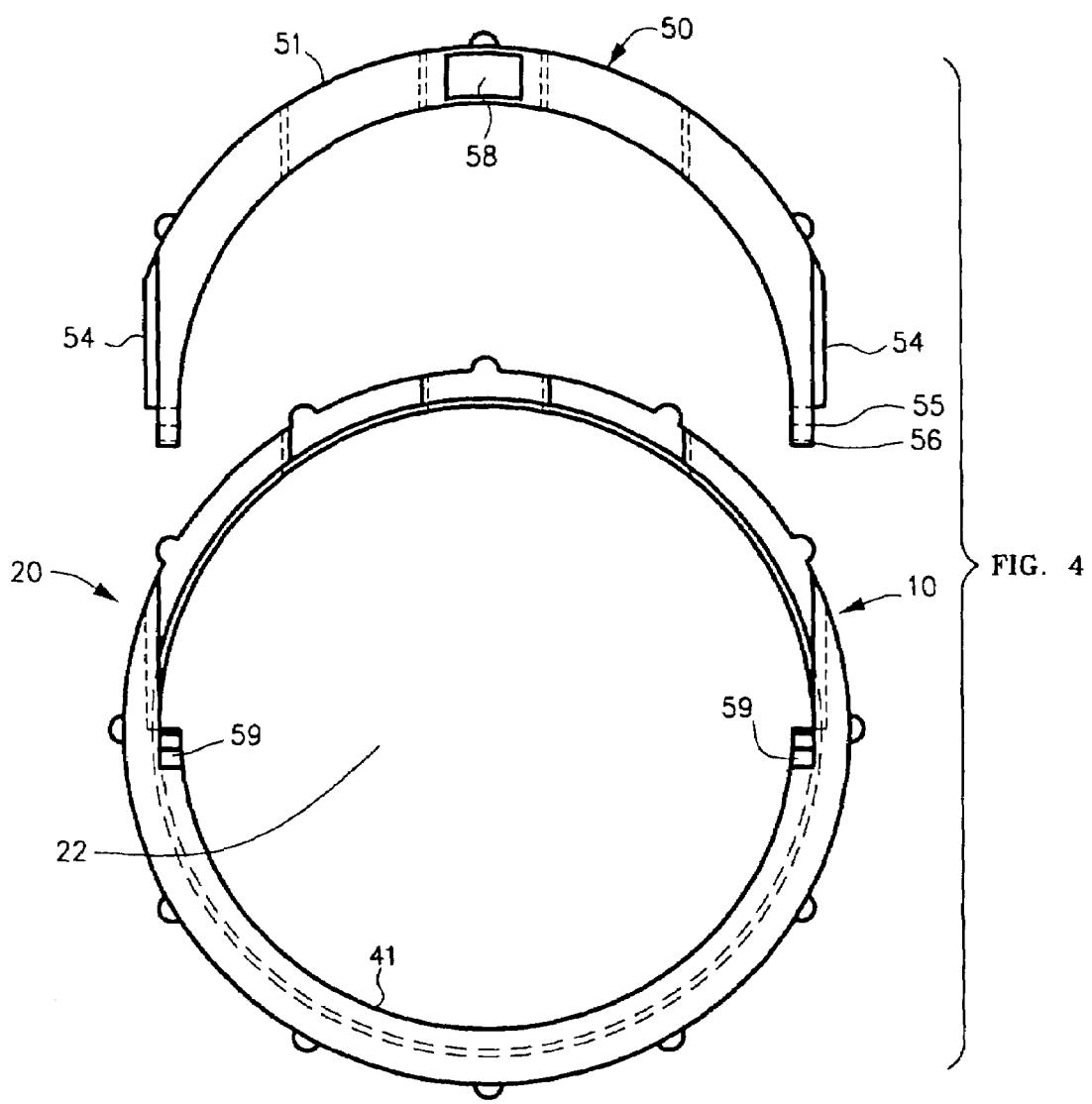
FIG. 4 is an exploded top view of the union nut body and lock member.

FIG. 1 is an environmental, perspective, exploded view of the union nut with lock member 10 with a threaded pipe 120, a gasket 100, and a flanged pipe 140. FIG. 2 is a side section view of the union nut body 20 and flanged pipe 140 of FIG. 1, with union nut body 20 in position to be slipped over flange 143 of flanged pipe 140.

Figure 5:
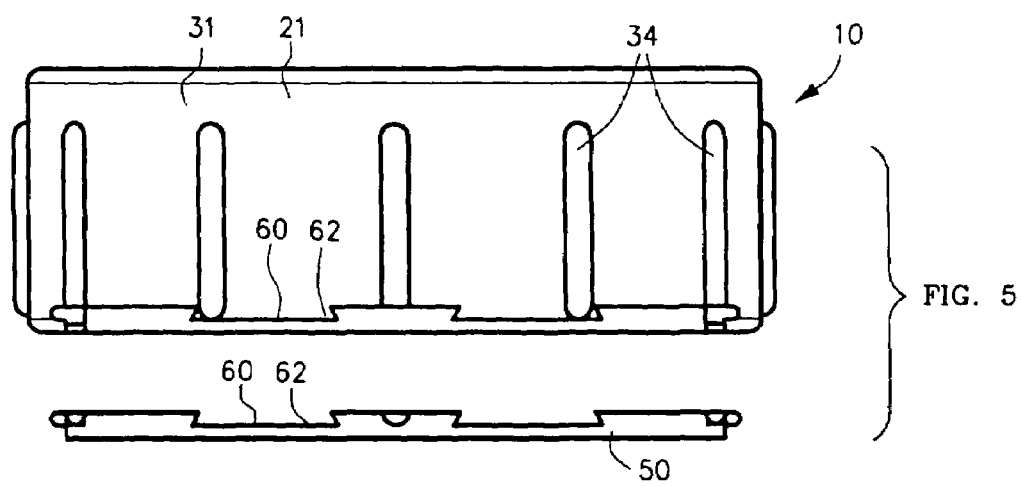
FIG. 5 is an exploded side view of the union nut body and lock member.

FIG. 3 is a side section view of the threaded pipe 120, gasket 100, union nut body 20, and flanged pipe 140 of FIG. 1 assembled into a joint, with union nut lock member 50 in position to be snapped into engagement with union nut body 20. FIG. 4 is an exploded top view of the union nut body 20 and lock member 50. FIG. 5 is an exploded side view of the union nut body 20 and lock member 50.

Flanged pipe 140 includes attached end 141, shown cut away, and free end 142, to which is attached flange 143 extending radially outward from free end 142. Attached end 141 may be attached to another flange 143 or to another pipe (not shown), or otherwise unavailable for sliding a conventional union nut onto.

Threaded pipe 120 includes attached end 121, shown cut away, and free end 122. Attached end 121 may be attached to a spa, another pipe, or be otherwise unavailable for sliding a conventional union nut onto. Free end 122 includes butt 125 and exterior surface 123, which includes pipe threading 124. The outside diameter of pipe threading 124 is about equal to the outside diameter of flange 143. Gasket 100 is adapted for seating against butt 125 to provide a watertight seal. Butt 125 optionally includes groove 126 for accepting a gasket 100, such as an O-ring.

Union nut device 10 generally includes cylindrical body 20 and lock member 50. Cylindrical body 20 includes wall 21 and a thread retaining end 30, which includes an outer surface 31 and an inner surface 32 having threads 33 adapted to mate with pipe threading 124. Outer surface 31 typically includes means to aid a hand in rotating body 20, such as gnurling 34. Body 20 defines an inner bore 22 having a longitudinal axis 23.

Body 20 further includes a flange retaining end 40, including partial collar 41 that projects radially inward from wall 21 and beyond inner surface 32. The width of partial collar 41 is equal to or slightly greater than the width of pipe flange 143. Partial collar 41 extends only partially around the circumference of wall 21, defining an aperture 43 that is large enough to receive flange 143 without deformation of partial collar 41 or wall 21. In the preferred embodiment illustrated in the drawings, partial collar 41 extends about half-way around the circumference of wall 21.

Lock member 50 is adapted to removably engage with body 20. When lock member 50 is engaged, central arc portion 51 "completes the circle" of the cut away portion of partial collar 41. Central arc portion 51 and partial collar 41 cooperate to fully retain and support flange 143. When lock member 50 is engaged with body 20 and received pipe flange 143, received pipe flange 143 is rigidly supported over its full width and circumference such that flange 143 can be held in watertight connection with threaded pipe 120.

Lock member 50 includes cooperative detent means 55 such as protrusion 56. Body 20 includes cooperative detent means 44 such as depression 47. Cooperative detent means 55,44 cooperate to retain lock member 50 in the engaged position unless forcefully and deliberately disengaged, such as by prying with a screwdriver. Central arc 51 optionally includes scoop 58 for providing better traction for a thumb to move lock member 50 perpendicular to axis 23.

To help ensure that lock member 50 engages properly with body 20, lock member 50 and body 20 include cooperative alignment means 60, such as lock member alignment means 61 and body alignment means 62. In the preferred embodiment best seen in FIGS. 4 and 5, cooperative alignment means 60 comprises interlocking dovetails that cause lock member 50 to slide into engagement with body 20 in correct alignment. Cooperative alignment means 60 allows lock member 50 to slidably engage with body 20 by movement in a direction perpendicular to longitudinal axis 23, but resist forces parallel to axis 23.

As best seen in FIG. 1, cooperative detent means 44 of body 20 includes a spur 45 at each end of partial collar 41. Each spur 45 defines a slot 46 underneath. Lock member 50 includes a wing 54 at each end. Wing 54 is adapted to slidably engage with spur 45 and slot 46. The interaction of wing 54 with spur 45 and slot 46 further prevents forces parallel to axis 23 from disengaging lock member 50 from body 20. When lock member 50 is engaged with body 20, a small gap 59 remains available between wing 54 and partial collar 41, for inserting the tip of a screwdriver, or other suitable tool, to disengage lock member 50 from body 20 if necessary to disassemble union nut with lock member 10.

The method of using union nut with lock member 10 is outlined in FIGS. 1 through 3. Body 20 is slipped over flange 143 of free end 142 of flanged pipe 140 by tilting and moving body 20 relative to flange 143 such that aperture 43 passes over flange 143. After flange 143 has been received into aperture 143, partial collar 41 prevents body 20 from being able to be pulled off of flanged pipe 140 by pulling parallel to axis 23 because partial collar 41 interferes with flange 143.

Next, lock member 50 is engaged with body 20 by sliding lock member 50 in a direction perpendicular to axis 23 until protrusion 56 snaps into depression 47 of body 20. Central arc 51 of lock member 50 now cooperates with partial collar 41 to fully retain flange 143 such that body 20 cannot be removed from flange 143, even by tilting body 20.

With lock member 50 engaged, union nut with lock member 10 is functionally equivalent to a conventional union nut and is ready to be mounted onto threaded pipe 120 by rotating threaded end 30 about axis 23 so as to mate threads 33 of union nut 10 with threading 134 of threaded pipe 120. Optionally, a gasket 100, such as an O-ring, may be placed between butt 125 and flange 143.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A union nut for connecting an end of a threaded pipe having exterior threading to an end of a flanged pipe having an exterior flange; said union nut including:
  a generally cylindrical body having a longitudinal axis; including:
    a body wall; including:
      a thread retaining end for attaching to the exterior threading of the end of the threaded pipe; said thread retaining end including:
        an outer surface:
        an inner surface including:
          threads adapted for mounting upon the threading of the threaded pipe;
      a flange retaining end; including:
        a partial collar projecting radially inward beyond said inner surface and defining an aperture for receiving the flange of the flanged pipe such that said partial collar partially retains the received flange within said body;
        first cooperative detent means; and
        first cooperative alignment means; and
    a lock member including:
      second cooperative detent means; and
      second cooperative alignment means;
  said lock member adapted to be removably engaged with said body such that, when engaged, said lock member and said partial collar cooperate to fully retain the received flange; and said first and second cooperative detent means adapted to cooperate when lock member is engaged with said collar so as to prevent casual disengagement of said flange retaining end and said lock member; and
  said first and second cooperative alignment means adapted to cooperate to align said lock member with said flange retaining end such that said lock member engages with said flange retaining end by sliding in a direction perpendicular to said longitudinal axis and resists disengagement by forces not perpendicular to said axis.

2. In combination:
a flanged pipe; including:
  an unattached end; and
  a pipe flange extending radially outward from said unattached end;
a threaded pipe; including:
  an unattached end; including:
    an exterior surface; including:
      pipe threading; and
a union nut connecting said flanged pipe to said threaded pipe; including:
  a generally cylindrical body defining an inner bore having a longitudinal axis; said body including:
    a thread retaining end; including:
      an outer surface;
      an inner surface including:
        thread mount means mounted upon said pipe threading;
    a flange retaining end; and
  a flange lock member adapted to be removably engaged with said body such that, when engaged, said flange lock member and said flange retaining end cooperate to fully retain said received pipe flange within said inner bore and to be able to maintain said received pipe flange in connection with said threaded pipe and wherein said lock member engages with said flange retaining end by sliding in a direction perpendicular to said longitudinal axis of said inner bore.

3. The combination of claim 2, further including:
a gasket disposed between said pipe flange and said unattached end of said threaded pipe.

4. The combination of claim 2, said thread mount means comprising:
nut threads adapted to mate with said pipe threading.

5. A union nut for connecting an end of a threaded pipe having exterior threading to an end of a flanged pipe having an exterior flange; said union nut including:
a generally cylindrical body having a longitudinal axis; including:
  a body wall; including:
    a thread retaining end for attaching to the exterior threading of the end of the threaded pipe; said thread retaining end including:
      an outer surface;
      an inner surface including:
        threads adapted for mounting upon the threading of the threaded pipe;
    a flange retaining end; including:
      a partial collar projecting radially inward beyond said inner surface and defining an aperture for receiving the flange of the flanged pipe such that said partial collar partially retains the received flange within said body; and
      first cooperative alignment means; and
  a lock member adapted to be removably engaged with said body such that, when engaged, said lock member and said partial collar cooperate to fully retain the received flange; including:
    second cooperative alignment means; said first and second cooperative alignment means adapted to cooperate to align said lock member with said flange retaining end such that said lock member engages with said flange retaining end by sliding in a direction perpendicular to said longitudinal axis and resists disengagement by forces not perpendicular to said axis.

6. The union nut of claim 5, wherein said lock member and said partial collar combine to form a circular collar for retaining the received flange, and having an inner diameter equal or greater than the inner diameter of the received flange.

7. In combination:
a flanged pipe; including:
  an unattached end; including
    a pipe flange;
a threaded pipe; including:
  an unattached end; including:
    an exterior surface; including:
      pipe threading; and
a union nut connecting said flanged pipe to said threaded pipe; including:
  a generally cylindrical body defining an inner bore having a longitudinal axis; said body including:
    a thread retaining end; including:
      an outer surface;
      an inner surface including:
        nut threads mounted upon said pipe threading;
    a flange retaining end; including:
      a partial collar projecting radially inward into said inner bore and defining an aperture for receiving said pipe flange such that said partial collar partially retains said received pipe flange within said inner bore; and
      first cooperative alignment means
  a lock member adapted to be removably engaged with said body, including:
    second cooperative alignment means;
said lock member engaged with said body such that said lock member and said partial collar cooperate to fully retain said received pipe flange within said inner bore and be able to maintain said received pipe flange in connection with said threaded pipe; and said first and second cooperative alignment means adapted to cooperate to align said lock member with said flange retaining end such that said lock member engages with said flange retaining end by sliding in a direction perpendicular to said longitudinal axis and resists disengagement by forces not perpendicular to said axis.

* * * * *